(12) United States Patent
Salvaire et al.

(10) Patent No.: US 7,901,314 B2
(45) Date of Patent: Mar. 8, 2011

(54) TRANSMISSION SYSTEM FOR PUMP DRIVE

(75) Inventors: André Salvaire, Montigny le Bretonneux (FR); James Metson, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 814 days.

(21) Appl. No.: 11/849,470

(22) Filed: Sep. 4, 2007

(65) Prior Publication Data
US 2008/0182699 A1 Jul. 31, 2008

(30) Foreign Application Priority Data

Sep. 13, 2006 (EP) .................................... 06291449

(51) Int. Cl.
*F16H 47/04* (2006.01)
(52) U.S. Cl. ............................ 475/72; 475/73
(58) Field of Classification Search .................... 475/72, 475/73
See application file for complete search history.

(56) References Cited

U.S. PATENT DOCUMENTS

| 4,311,066 | A | * | 1/1982 | Schuhmann | .................... 475/76 |
| 4,489,623 | A | | 12/1984 | Hakkenberg | |
| 6,431,127 | B2 | | 8/2002 | Weber | |
| 6,527,662 | B2 | | 3/2003 | Miyata et al. | |
| 2006/0016599 | A1 | * | 1/2006 | Badalamenti et al. | ......... 166/285 |
| 2009/0041588 | A1 | * | 2/2009 | Hunter et al. | .................... 417/27 |

FOREIGN PATENT DOCUMENTS

EP 0485094 10/1991

* cited by examiner

*Primary Examiner* — Sherry Estremsky
(74) *Attorney, Agent, or Firm* — David Cate; Robin Nava; Jeffrey Griffin

(57) ABSTRACT

A transmission system for use in a pump system comprising a prime mover driving a pump, the transmission system comprising: an epicylic gear system comprising a sun gear and a ring gear, and a planet gear engaged between the sun gear and ring gear; a main input drive arranged to be driven by the prime mover; an auxiliary input drive arranged to be driven by the prime mover; and an output drive arranged to drive the pump; wherein the main input drive is connected to the sun gear and either (i) the auxiliary input drive is connected to the ring gear and the output drive is lead from the planet gear; or (ii) the auxiliary input drive is connected to the planet gear and the output drive is lead from the ring gear.

18 Claims, 5 Drawing Sheets

TRANSMISSION SYSTEM FOR PUMP DRIVE

RELATED APPLICATION DATA

This application claims the benefit of EP Patent Application 06291449.4 filed Sep. 13, 2006 entitled, "Transmission System for Pump Drive."

TECHNICAL FIELD

The present invention relates to transmission systems for taking drive from a prime mover to an operating unit. In particular, the invention related to such a transmission for use in driving pump, especially pumps of the type used in the oil and gas exploration and production industries for fracturing and cementing operations.

BACKGROUND ART

During hydraulic fracturing pumping operations on oil or gas wells it is often necessary to pump fluids downhole from the surface at high pressures and flow rates. Depending on the well and the particular operation being performed, it may be necessary to provide in excess of 12000 HP to overcome the downhole pressure at the desired volumetric rate.

In a typical fracturing pump setup, several pumps are used, each typically being fitted with a diesel engine as primary driver for a high pressure triplex or quintuplex positive displacement pump, coupled through a five to seven speed transmission. Each pump typically delivers between 1500 to 2000 HP depending on the type and size of the engine fitted. Large fracturing operations can require more than 16 pumping units to be available at the well site to meet the pumping power requirements and provide backup in case of failure of individual units.

Due to the nature of the wells it is often necessary to start the pumping operation against an existing well pressure. This is known to put a high stress on the pump transmission and occasionally cause failure.

In the event that an active pump fails during the operation, a stand-by unit is required to take its place. In this case the stand-by pump will need to start against a high pressure from standstill. In order to do this, operators must put the engine at speed and engage the desired gear. The transmissions typically used are fitted with a torque converter that allows a limited amount of slip between engine speed and pump speed. However the unit will only tolerate running with such internal slippage for a very limited amount of time.

An increase is sometimes required to the overall pumping volumetric rate. In most cases this can only be done by changing gears on the transmission of some of the pumps, or starting other pumps.

All of the above operations place a great strain on the transmission systems, pumps and engines which can lead to unreliability and reduced operational life.

Conventional cementing or fracturing pump units are typically provided with a five-gear automatic transmission to allow either the full pump flow capacity or the full pump input torque. The weakness of this system is that for pumping under pressure, the engine must be at peak torque speed when the transmission is shifting up or down damaging the transmission disks.

An alternative to this type of transmission is a conventional hydrostatic transmission (HST) comprising a variable volume pump drive by the engine and a hydraulic motor drive by this pump. Such systems provide a gearless drive mechanism that translates engine power to hydraulic power continuously. Such systems are widely applied in construction machinery, because of their superior speed changeability. However HST does have certain problems that make is unsuitable for pumping systems, e.g. limited low speed/torque range and narrow shift range.

HST is one form of a continuously variable transmission (CVT). A CVT avoids some of the problems of changing gears in a conventional automatic gear box by allowing any ratio of input and output to be obtained. Mechanical CVTs are well known in automotive applications.

An extension to CVT design, sometimes known as the Infinitely Variable Transmission (IVT), allows the transmission to drive a vehicle backwards as well as forwards. Transmission input is split into two shafts with one connected to an epicyclic gear set and the other to a CVT. The output from the CVT is connected to a different set of gears in the epicyclic. The gear that does not draw power from engine or CVT transfers torque to the transmission output. The epicyclic gear set acts as a mechanical adding machine to subtract or add one speed from the other.

Hybrid automobiles also use epicylic gear system to allow both power sources to be connected to the vehicle transmission.

An object of this invention is to provide a transmission system that has the advantages of a CVT in a form that can be used effectively in a pump drive system. This object is achieved in the invention by the use of a epicylic gear system.

DISCLOSURE OF THE INVENTION

One aspect of the invention comprises a transmission system for use in a pump system comprising a prime mover driving a pump, the transmission system comprising:
- an epicylic gear system comprising a sun gear and a ring gear, and a planet gear engaged between the sun gear and ring gear;
- a main input drive arranged to be driven by the prime mover;
- an auxiliary input drive arranged to be driven by the prime mover; and
- an output drive arranged to drive the pump;
- wherein the main input drive is connected to the sun gear and either
  (i) the auxiliary input drive is connected to the ring gear and the output drive is lead from the planet gear; or
  (ii) the auxiliary input drive is connected to the planet gear and the output drive is lead from the ring gear.

By connecting the main and auxiliary input drives in this manner, the epicyclic gear system acts to mechanically add or subtract the two drives and so provide any input:output ratio according to the speed and direction of each drive. Changes to the ratio can be made without any harsh physical shocks on either the transmission system, prime mover or pump.

The planet gear typically comprises a number of gears mounted on a carrier, the auxiliary input drive or the output drive being connected to the carrier.

Preferably, the auxiliary input drive can operate in forward or reverse directions.

Another aspect of the invention comprises a pump system comprising a prime mover arranged to drive a pump via a transmission system according to the previous aspect of the invention.

The main and auxiliary input drives can be mechanical or hydraulic.

It is preferred that a torque converter is provided between the prime mover and the transmission system.

The pump is preferably a pump such as a triplex or quintuplex pump for use fracturing, cementing or coil tubing operations in oil wells.

MODE(S) FOR CARRYING OUT THE INVENTION

The invention is aimed at providing smooth power and/or torque transfer between a prime mover (e.g. diesel engine, electric motor) and the pump, allowing the assembly to have full power and/or torque available irrespective of the speed.

The basic structure of a system according to the invention based on a single split input that uses an epicylic gear train as differential mechanism, one differential output being used to drive the pump and the second differential output being connected to a speed regulating mechanism (the auxiliary drive) such that this second output is in effect an input and the differential acts to combine the two inputs rather than to split a single input into two outputs. Thus the main input drive (diesel engine or electric motor) can be allowed to run at constant speed at the maximum torque speed and drive the pump from 0 rpm to maximum without the need of step gears. This allows the unit to start from standstill and gradually increase the pump speed to the desired operation speed without any slippage or gear changes and maintaining the primary drive at a constant speed.

A suitable epicylic gear train mechanism consists of a sun gear, a planetary gear, a ring gear and two or more carriers that constrain the planetary gear. In conventional operation of epicylic gear systems, by selecting any two components as, input and output from sun, ring gear and planet gear carrier, and constraining remaining one component, the epicylic gear system is used as reduction or step gear. In the system according to the invention, input or output is given at this constraint point. The differential gear is made by splitting or combining input and output.

Figure 1:
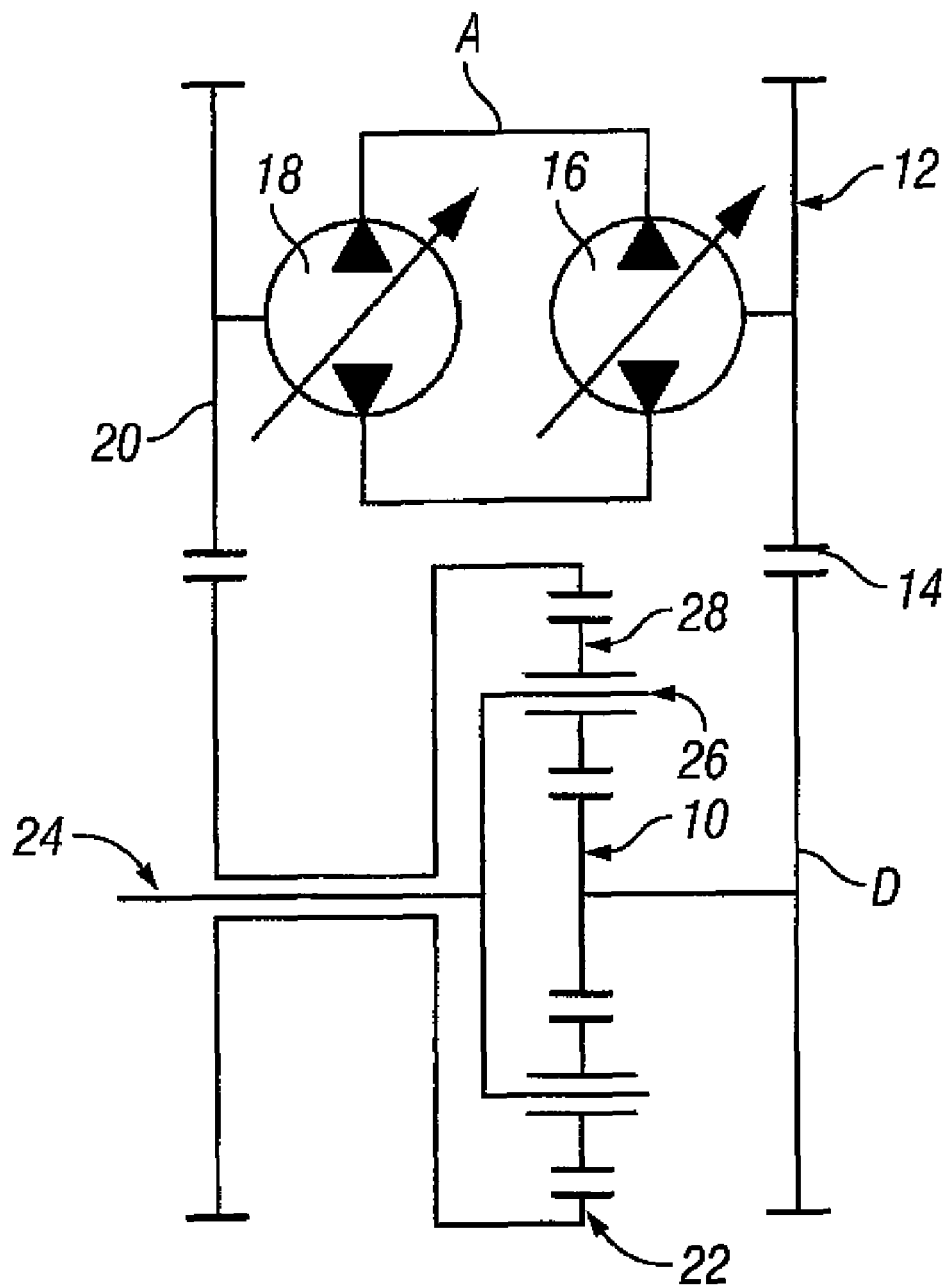
FIG. 1 shows a schematic of a transmission system according to an embodiment of the invention.

FIG. 1 shows a schematic of a transmission system according to an embodiment of the invention for use in driving a fracturing pump in an oil well stimulation operation. Drive from the prime mover D (diesel engine) is lead to the sun gear 10 of the epicylic transmission system. Drive is also lead from the prime mover D to the input end 12 of an auxiliary drive system A via suitable connection 14.

The auxiliary drive A in the embodiment of FIG. 1 is an HST (hydraulic pump/motor), the input drive 12 from the prime mover D being used to drive the HST pump 16 which in turn is used to drive the HST motor 18 in the usual manner. The output end of the auxiliary drive A is provided with a drive connection 20 which is in turn lead to the ring gear 22 of the epicyclic transmission system.

The output shaft 24 is connected to the carrier 26 of the planet gear 28 in the epicylic transmission system. The output shaft is connected to the fracturing pump P.

In this embodiment, the auxiliary drive A is acting as a continuously variable input to the epicylic differential. By controlling the auxiliary drive A, a part of the output from the prime mover can be applied to the ring gear of the transmission system to determine the final drive ratio applied to the pump P. Thus speed control of the output shaft 24 is effected by controlling the speed and direction of the auxiliary drive A while the prime mover speed can remain effectively constant.

Figure 2:
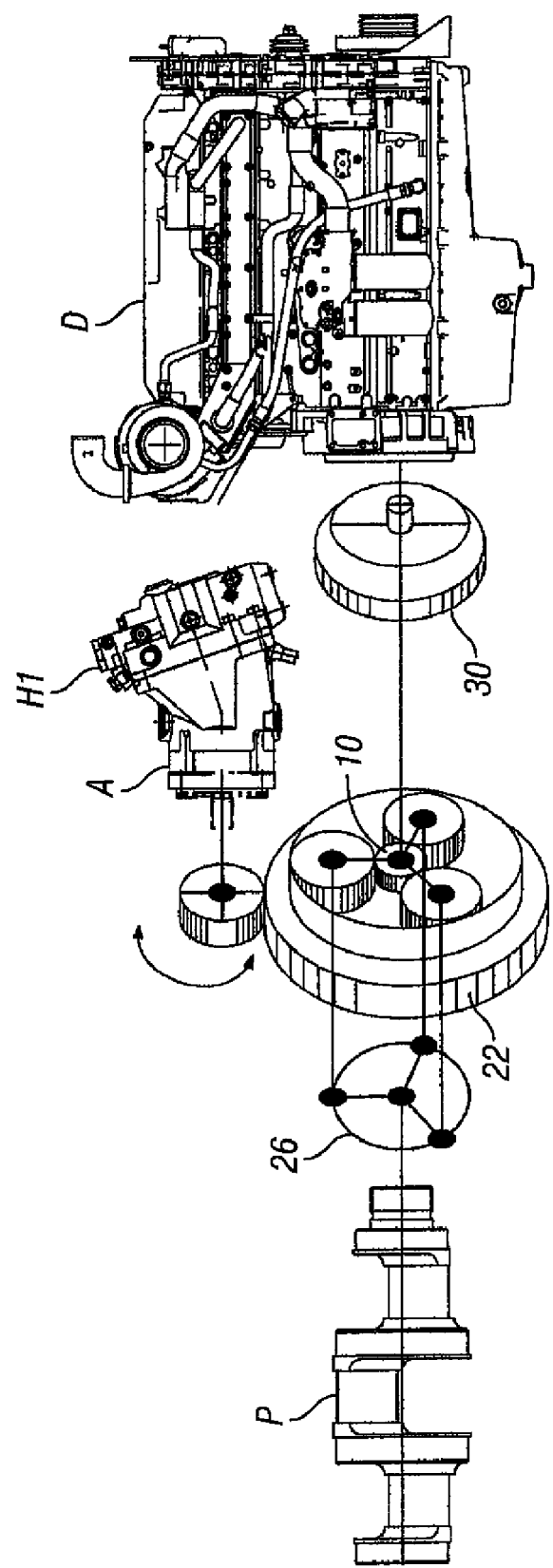
FIGS. 2-5 show schematic views of various embodiments of the invention.
Figure 3:
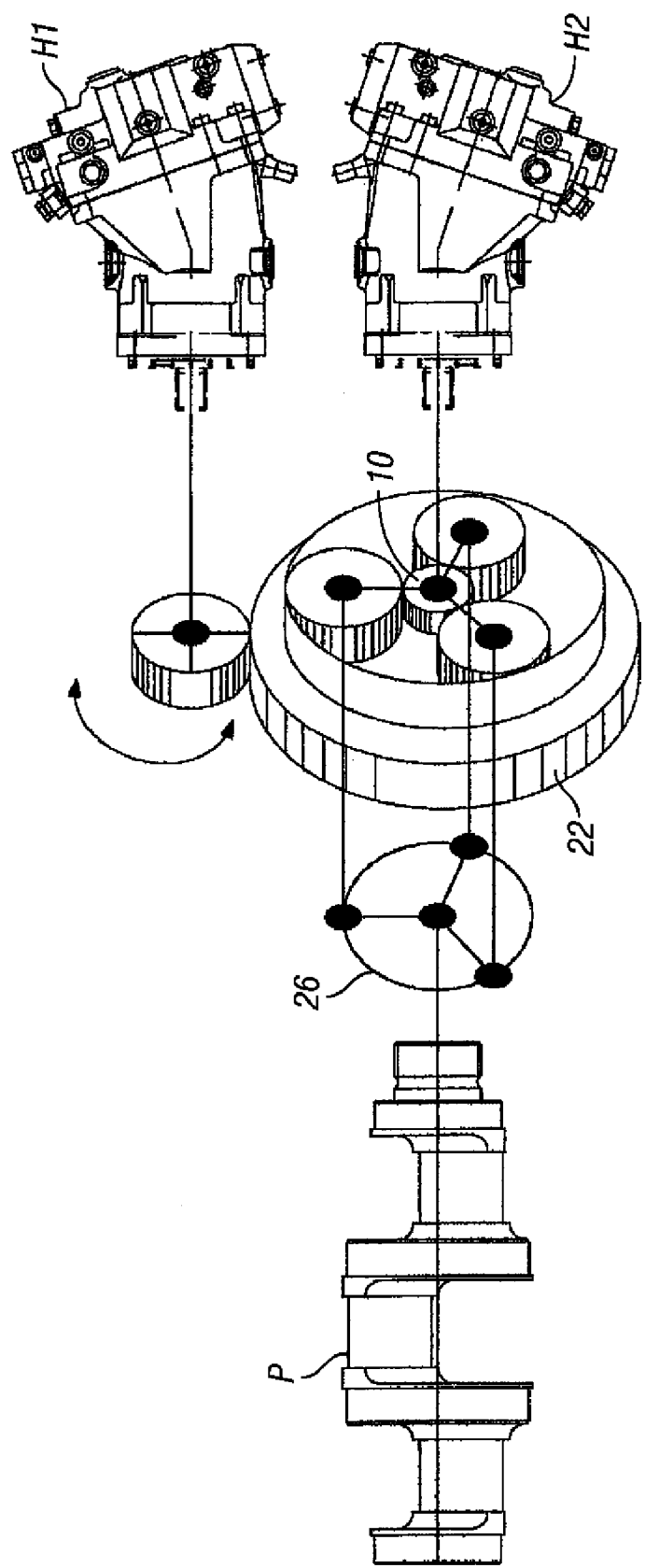
Figure 4:
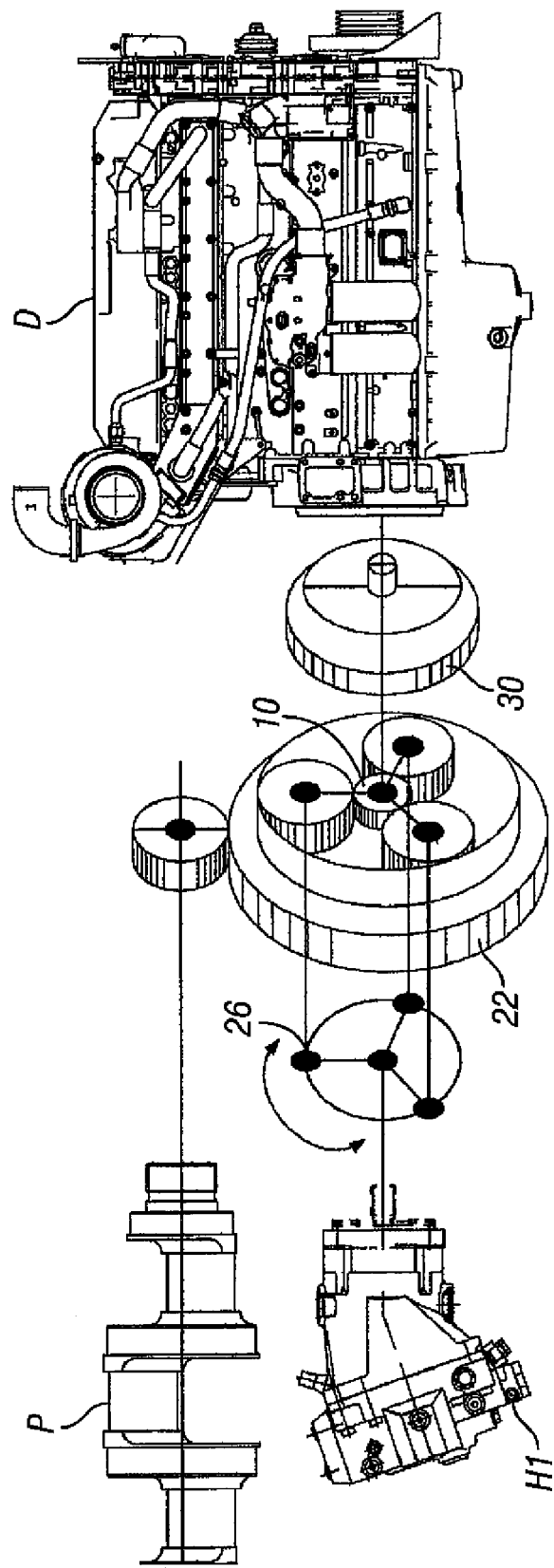
Figure 5:
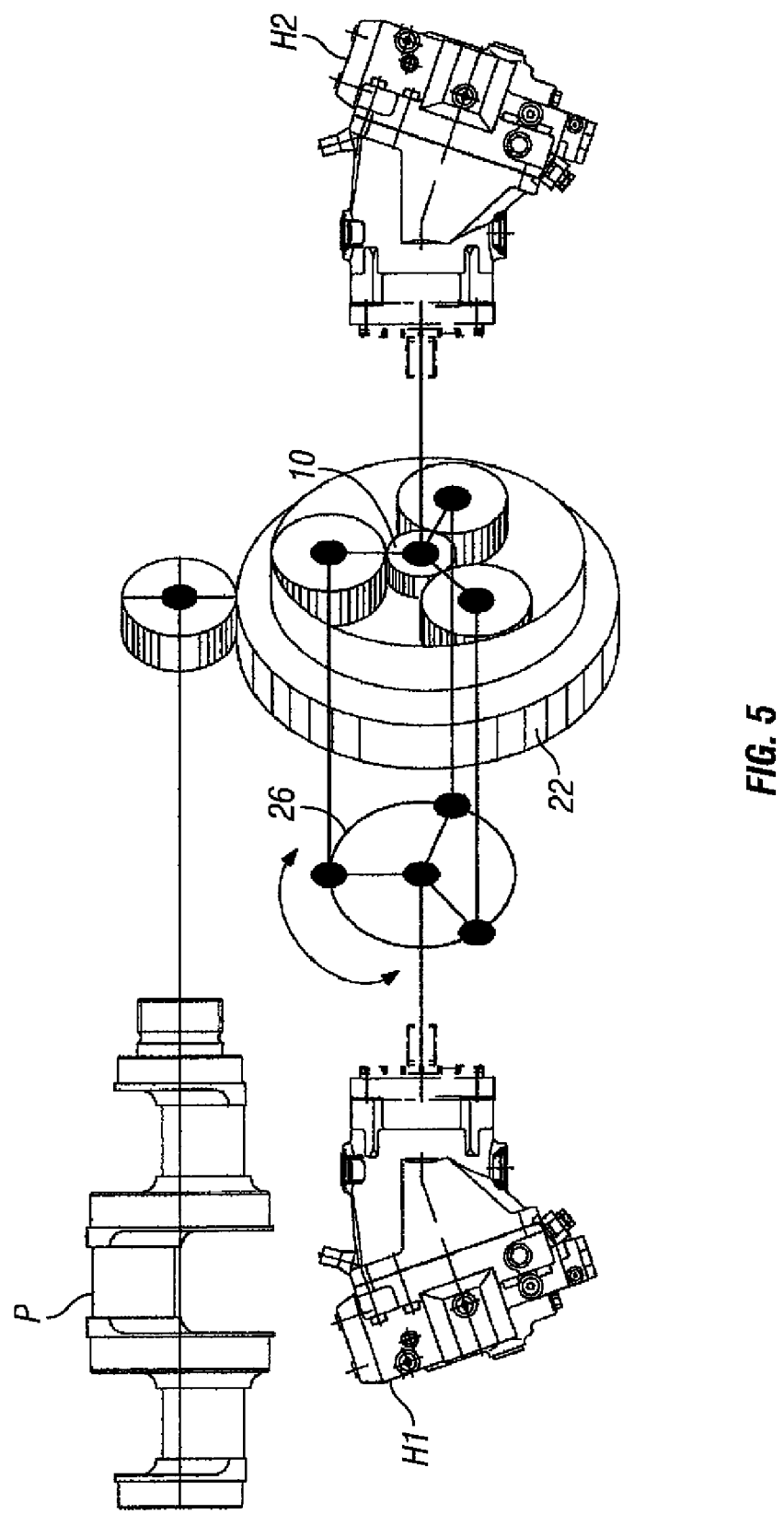

Various changes can be made to this embodiment. FIG. 2 shows schematically the arrangement of FIG. 1 in which the prime mover D is connected to the sun gear 10, the auxiliary drive A (in this case constituted by HST H1 which is powered from the prime mover D) is connected to the ring gear 22 and the pump shaft P is connected to the planet gear carrier 26. FIG. 3 shows a variation of this embodiment wherein the drive to the sun gear 10 is provided by a further HST H2, also powered by the prime mover (not shown). FIG. 4 shows a different configuration in which the prime mover D is connected to the sun gear 10, the auxiliary drive A (constituted by HST H1 which is powered from the prime mover D) is connected to the planet gear carrier 26 and the pump shaft P is connected to the ring gear 22. FIG. 5 shows the corresponding arrangement with two HSTs (HST1 and HST2) in pace of the arrangement of the prime mover D and auxiliary HST1 of FIG. 4 (cf FIG. 3). In another variation, the HST of the auxiliary (or main) drive can be replaced by another form of CVT.

One particularly preferred variation is to provide a torque converter 30 at the prime mover end to improve its characteristics on start-up and shutdown and during major changes of speed and torque delivery. The torque converter is shown in FIGS. 2 and 4.

Other changes can be made while remaining within the scope of the invention.

The invention claimed is:

1. A transmission system for use in a pump system comprising a prime mover driving a pump, the transmission system comprising:
    an epicyclic gear system comprising a sun gear, a ring gear, and at least one planet gear engaged between the sun gear and the ring gear:
    a main input drive arranged to be driven by the prime mover, wherein the main input drive is a hydrostatic transmission;
    an auxiliary input drive arranged to be driven by the prime mover; and
    an output drive arranged to drive the pump;
    wherein the main input drive is connected to the sun gear and either:
        (i) the auxiliary input drive is connected to the ring gear and the output drive is lead from the planet gear, or
        (ii) the auxiliary input drive is connected to the planet gear and the output drive is lead from the ring gear.

2. The transmission system as claimed in claim 1, wherein the planet gear comprises at least one gear mounted on a carrier, the auxiliary drive or the output drive being connected to the carrier.

3. The transmission system as claimed in claim 1, wherein the auxiliary input drive can operate in forward and reverse directions.

4. The transmission system as claimed in claim 1, wherein the auxiliary input drive is a hydrostatic transmission.

5. A pump system comprising:
    a prime mover configured to drive a main input drive and an auxiliary input device;
    a torque converter between the prime mover and a transmission system;
    a pump connected to the output drive; and
    the transmission system including an epicyclic gear system comprising a sun gear, a ring gear, and at least on planet gear engaged between the sun gear and the ring gear, wherein the main input drive is connected to the sun gear and either:

(i) the auxiliary input drive connected to the ring gear and the output drive is lead from the planet gear, or, (ii) the auxiliary input drive is connected to the planet gear and the output drive is lead from the ring gear.

6. The pump system as claimed in claim 5, wherein the main input drive and the auxiliary input device is a one of a mechanical drive and a hydraulic drive.

7. The pump system as claimed in claim 5, wherein the pump is a fracturing pump for use in oil well operations.

8. The pump system as claimed in claim 7, wherein the pump is a triplex positive displacement pump.

9. The pump system a as claimed in claim 7, wherein the pump is a quintuplex positive displacement pump.

10. The pump system as claimed in claim 5, wherein the prime mover is a diesel engine.

11. The pump system as claimed in claim 5, wherein the prime mover is an electrical engine.

12. A method of pumping fluid to a wellbore, comprising providing a pump system including a prime mover configured to drive a main input drive and an auxiliary input drive, a torque converter between the prime mover and a transmission system, a pump connected to an output drive, and the transmission system including an epicyclic gear system comprising a sun gear, a ring gear, and at least one planet gear engaged between the sun gear and the ring gear, wherein the main input drive is a hydrostatic transmission connected to the sun gear and either:

(i) the auxiliary input drive connected to the ring gear and the output drive lead from the planet gear, or, (ii) the auxiliary input drive is connected to the planet gear and the output drive is lead from the ring gear;

connecting the pump system to a fluid supply; and operating the pump system to supply the fluid from the fluid supply to the wellbore.

13. The method of claim 12, wherein the fluid is any taken in the list constituted by: fluid able to set, cement slurry, acid, fracturing fluid, and treating fluid for the wellbore.

14. The method of claim 12, wherein the pump is a cementing pump for use in oil well operations.

15. The method of claim 12, wherein the pump is a triplex positive displacement pump.

16. The method of claim 12, wherein the pump is a quintuplex positive displacement pump.

17. The method of claim 12, wherein the prime mover is a diesel engine.

18. The method of claim 12, wherein the prime mover is an electric motor.

* * * * *